United States Patent
Choi et al.

(10) Patent No.: US 9,851,486 B2
(45) Date of Patent: Dec. 26, 2017

(54) LIGHTING UNIT

(71) Applicant: LG INNOTEK CO., LTD., Seoul (KR)

(72) Inventors: Man Hue Choi, Seoul (KR); Min Jae Kim, Seoul (KR); Bi Yi Kim, Seoul (KR); Se Woong Na, Seoul (KR); Hyun Gyu Park, Seoul (KR); In Hee Cho, Seoul (KR); Seung Kwon Hong, Seoul (KR)

(73) Assignee: LG INNOTEK CO., LTD, Seoul (KR)

( * ) Notice: Subject to any disclaimer, the term of this patent is extended or adjusted under 35 U.S.C. 154(b) by 106 days.

(21) Appl. No.: 14/291,526

(22) Filed: May 30, 2014

(65) Prior Publication Data

US 2015/0003110 A1 Jan. 1, 2015

(30) Foreign Application Priority Data

Jun. 28, 2013 (KR) .................. 10-2013-0076069

(51) Int. Cl.
  *F21V 7/04* (2006.01)
  *F21V 8/00* (2006.01)

(52) U.S. Cl.
  CPC .......... *G02B 6/0011* (2013.01); *G02B 6/0088* (2013.01)

(58) Field of Classification Search
  CPC .. G02B 6/0011; G02B 6/0088; G02B 6/0091; G02B 6/0093
  USPC ...................................................... 362/612
  See application file for complete search history.

(56) References Cited

U.S. PATENT DOCUMENTS

| 8,894,237 B2* | 11/2014 | Kuromizu ......... G02F 1/133603 362/247 |
| 2010/0085772 A1* | 4/2010 | Song .................... G02B 6/0023 362/612 |
| 2010/0290248 A1 | 11/2010 | Park |
| 2012/0236228 A1* | 9/2012 | Tang ........................ F21S 8/00 349/61 |
| 2012/0249886 A1* | 10/2012 | Kuromizu ............ G02B 6/0091 348/725 |
| 2014/0126243 A1* | 5/2014 | Blessitt ................ G02B 6/0091 362/612 |

FOREIGN PATENT DOCUMENTS

| CN | 101556403 A | 10/2009 |
| CN | 102661550 A | 9/2012 |
| JP | 2011-216270 A | 10/2011 |
| JP | 2012-164627 A | 8/2012 |
| JP | 2012-220689 A | 11/2012 |
| WO | WO-2011-074354 A1 | 6/2011 |
| WO | WO-2011-132462 A1 | 10/2011 |
| WO | WO-2013-011940 A1 | 1/2013 |

OTHER PUBLICATIONS

European Search Report in European Application No. 14169737.5, dated Nov. 26, 2014.

\* cited by examiner

*Primary Examiner* — Anh Mai
*Assistant Examiner* — Matthew Peerce
(74) *Attorney, Agent, or Firm* — Saliwanchik, Lloyd & Eisenschenk (57) ABSTRACT

Provided is a lighting unit, including: a support substrate; a light guide plate for guiding light generated from a light source; and a first stopper fixed to the support substrate and configured to support the light guide plate.

16 Claims, 8 Drawing Sheets

LIGHTING UNIT

CROSS-REFERENCE TO RELATED APPLICATION

This application claims the benefit under 35 U.S.C. §119 of Korean Patent Application No. 10-2013-0076069, filed Jun. 28, 2013, which is hereby incorporated by reference in its entirety.

BACKGROUND OF THE INVENTION

Field of the Invention

Embodiments of the present invention relate to a lighting unit, and more particularly, to a lighting unit having improved structural reliability.

Description of the Related Arts

According to the development of electronics industries, various display devices have been developed, and imaging devices, computers, mobile communication terminal and the like using the display devices have been also developed. A liquid crystal display device appearing by reflecting the trend has been widely used as a display device for a monitor, a mobile communication terminal and the like.

A liquid crystal display (LCD) results from applying electro-optical properties of liquid crystal having an in-between characteristic of a liquid and a solid to a display device, and is an electrical device that changes various kinds of electrical information generated from various devices to visual information and transmit the changed visual information using a variation in transmittance of liquid crystal resulting from an applied voltage, and it is advantageous in that the LCD has low power consumption due to a low operating voltage and is also portable.

Since the LCD has no self-luminous which can make its own light, a separate lighting device is needed, and a light guide plate is used in order to effectively uniformly diffuse light emitted from the lighting device.

However, when the liquid crystal display is operated, the light guide plate expands thermally, or the light guide plate is separated due to external impact, so other constitutive elements in the lighting device are damaged, and thus a means for fixing the light guide plate is needed.

To do so, in a conventional art, the light guide plate is fixed using a fixing unit for fixing the light guide plate. In a lighting device of a liquid crystal display, an important problem to be solved is to effectively fix the light guide plate.

BRIEF SUMMARY

Embodiments of the present invention have been made keeping in mind the above problems occurring in the prior art, and an aspect of embodiments of the present invention may provide a lighting unit which enables a light package, a printed circuit board or the like to be effectively protected by forming a stopper in a structure capable of stably supporting a light guide plate.

Another aspect of embodiments of the present invention may provide a lighting unit having further improved structural reliability based on a structure in which a light guide plate can be stably supported by a stopper even when the light guide plate thermally expands.

A further aspect of embodiments of the present invention may provide a lighting unit which a stopper is configured to support a light guide plate in various directions so that stress generated due to thermal expansion of the light guide plate can be dispersed, thereby enabling a crack to be prevented from occurring in a light package or a printed circuit board.

According to an aspect of the embodiments of the present invention, a lighting unit may include: a support substrate; a light guide plate for guiding light generated from a light source; and a first stopper fixed to the support substrate and configured to support the light guide plate.

The lighting unit may further include a printed circuit board for mounting the light source and disposed on the support substrate, wherein the first stopper may pass through the printed circuit board.

The printed circuit board may include a through hole, wherein the first stopper is inserted into the through hole and is configured not to come into contact with the printed circuit board.

The support substrate may include: a first substrate portion on which the printed circuit board is stably fixed; and a second substrate portion extending to be bent from the first substrate portion.

The first stopper may be fixed to the first substrate portion.

The lighting unit may further include a second stopper fixed to the second substrate portion.

The first stopper or the second stopper may pass through the support substrate.

The first stopper or the second stopper may include: a body portion passing through the printed circuit board; and a fixed portion formed at an end of the body portion and fixed to the support substrate.

The first stopper and the second stopper may be fixed in different directions from each other.

The first stopper and the second stopper may be disposed to cross at right angles to each other.

The first stopper may be fixed in a space between the light source and an adjacent light source.

The first stopper may support one surface of the light guide plate into which light from the light source flows.

The fixed portion may be composed of a pin or a screw.

The first stopper or the second stopper may contain at least one of gold, silver, copper, tin, lead, iron, Al, Cr and mercury, at least one of glass, ceramic, cement, and refractory, or at least one of polyethylene terephthalate (PET), polycarbonate (PC), polyether sulfone (PES), polyimide (PI) and polymethyl methacrylate (PMMA).

The light source may be composed of light emitting diodes (LEDs).

The light unit may further include a light emitting package having the light source.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Herein below, embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted. Furthermore, it should be understood that the shape and size of the elements shown in the drawings may be exaggeratedly drawn to provide an easily understood description of the structure of the present invention.

Figure 1:
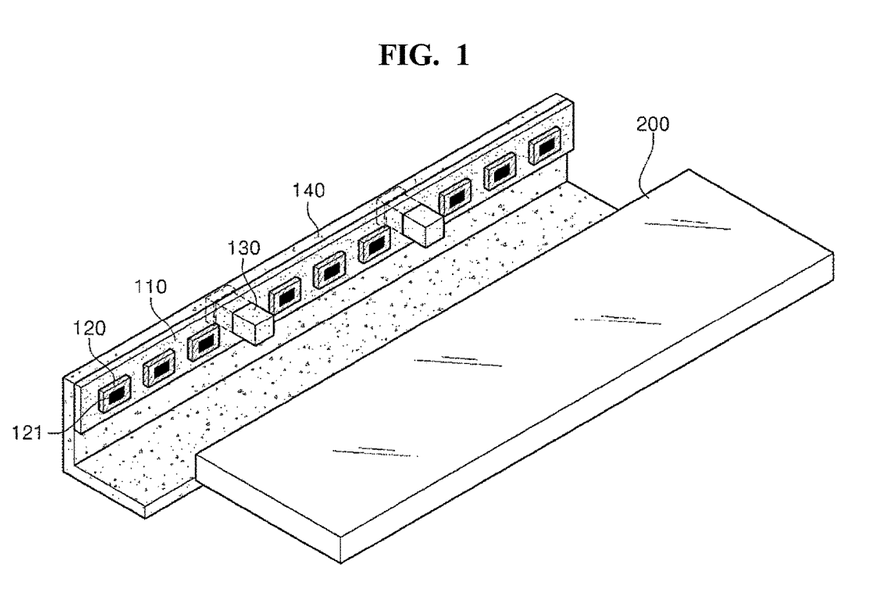
FIGS. 1 to 3 are views for explaining a lighting unit according to one embodiment of the present invention.
Figure 2:
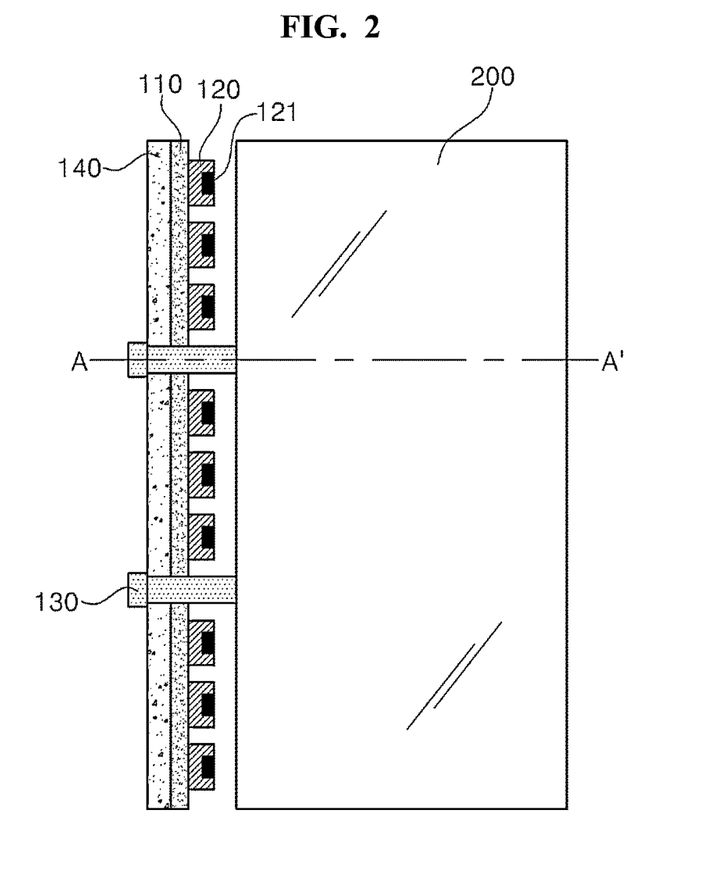
Figure 3:
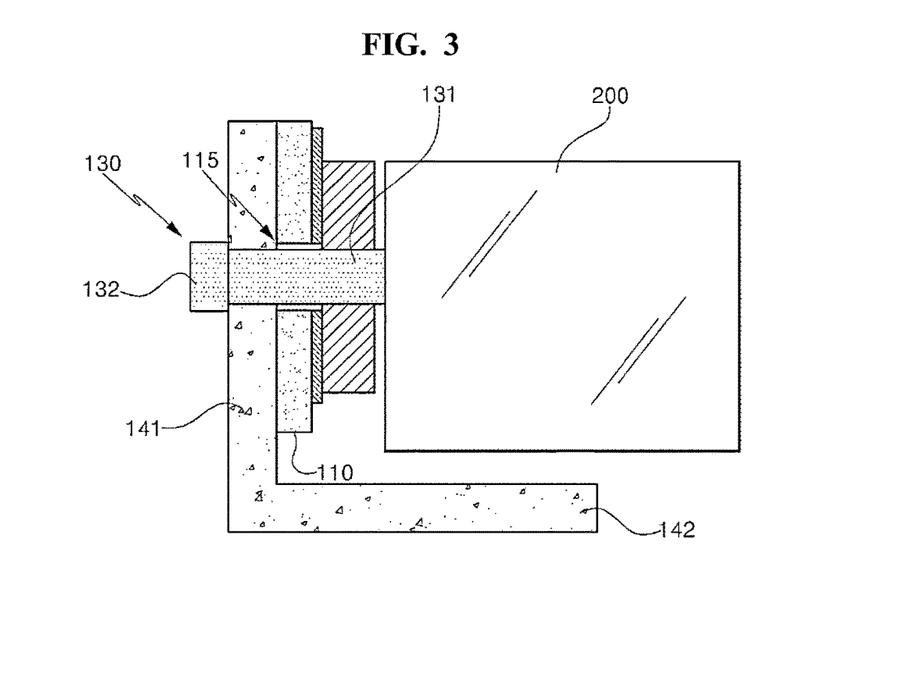

FIGS. 1 to 3 are views for explaining a lighting unit according to one embodiment of the present invention.

More specifically, FIG. 1 is a perspective view of a lighting unit according to the one embodiment of the present invention, FIG. 2 is a top view of a lighting unit according to the one embodiment of the present invention, FIG. 2 is a top view of a lighting unit according to the one embodiment of the present invention, and FIG. 3 is a cross-sectional view of a lighting unit according to the one embodiment of the present invention and illustrates a cross section taken along lines A-A' of FIG. 2.

The lighting device according to the present embodiment of the invention will be described with reference to FIGS. 1 to 3.

As illustrated in FIG. 1, the lighting unit according to the present embodiment of the invention includes: a printed circuit board 110; a light emitting package 120; and a stopper 130.

The light emitting package 120 is mounted on the printed circuit board 110, and a light source 121 is disposed in the light emitting package 120.

At this time, the printed circuit board 110 may be configured by printing a wiring pattern on a substrate made of a polyimide (PI) material or the printed circuit board 110 may be configured of a flexible printed circuit board on a substrate made of a metal material.

Meanwhile, a light emitting diode (LED) may be used as the light source 121.

In the lighting unit, a light guide plate 200 for uniformly diffusing light generated from the light source 121 is provided, and the stopper 130 supports the light guide plate 200.

That is, the stopper 130 prevents the light source 121, the light emitting package 120 or the printed circuit board from being damaged because the light guide plate 200 comes into contact with the light source 121 or the light emitting package 120 when the light guide plate 200 expands.

On the other hand, as illustrated in FIG. 1, the stopper 130 is configured to be disposed in a separation space between the light emitting package 120 and an adjacent light emitting package so as to support the light guide plate 200, thereby enabling the light source 121, the light emitting package or the printed circuit board 110 to be prevented from being damaged due to the light guide plate.

The configurations of the lighting unit according to the present embodiment of the invention will be hereinafter described in greater detail with reference to FIGS. 2 and 3.

The printed circuit board 110 may be configured to be stably mounted on a support substrate 140 made of a metal material.

Also, the light emitting package 120 having the light source 121 is mounted on the printed circuit board 110.

The stopper 130 passes through the support substrate 140, and when the printed circuit board 110 is mounted on the support substrate 140, the stopper 130 passes through the support substrate 140 and the printed circuit board 110.

The stopper 130 is disposed in a space between the light source 121 and an adjacent light source, or a space between the light emitting package 120 and an adjacent light emitting package, thereby supporting the light guide plate 200.

At this time, the stopper 130 may support one surface of the light guide plate 200 into which light from the light source 121 flows.

More specifically, as illustrated in FIG. 3, the stopper 130 is configured of a body portion 131 and a fixed portion 132, wherein the body portion 131 is configured to pass through the printed circuit board, and the fixed portion 132 is formed at an end of the body portion 131 and is fixed to the support substrate 141. At this time, when a pin or a screw is used as the fixed portion 132, the fixed portion may be surely fixed, thereby stably supporting the light guide plate.

Meanwhile, in the embodiment of FIGS. 1 to 3, the stopper 130 may be disposed on the support substrate 140 of a side on which the light emitting package 120 is mounted.

That is, the support substrate 140 may include a first substrate portion 141 corresponding a portion on which the printed circuit board 110 is stably mounted; and a second substrate portion 142 extending to be bent perpendicular to the first substrate portion 141, and the stopper 130 may be fixed on the first substrate portion 141 so as to support the light guide plate 200.

As such, when the stopper 130 is disposed on the first substrate portion 141, a through hole 115 is disposed on the first substrate portion 141 so that the stopper 130 may be configured to be inserted into the through hole 115 not to come into direct contact with the printed circuit board 110.

As such, when the stopper 130 is inserted into the through hole 115 of the printed circuit board 110, the stopper does not come into direct contact with the printed circuit board 110, thereby enabling a crack to be prevented from occurring in the printed circuit board even when the light guide plate 200 thermally expands.

Meanwhile, each of the support substrates 141, 142 may be made of at least one of Al, Au, Ag, and Cr, and the stopper 130 may contain at least one metal material of Al, Au, Ag, and Cr, at least one non-metallic inorganic material of glass, ceramic, cement, and refractory, or at least one resin material of polyethylene terephthalate (PET), polycarbonate (PC), polyether sulfone (PES), polyimide (PI) and polymethyl methacrylate (PMMA).

Figure 4:
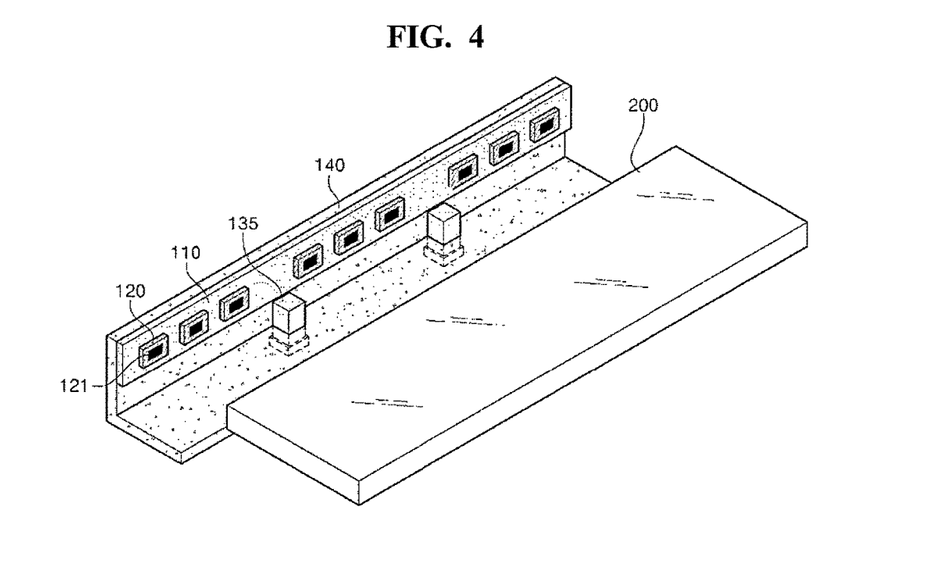
FIGS. 4 to 6 are views for explaining a lighting unit according to another embodiment of the present invention.
Figure 5:
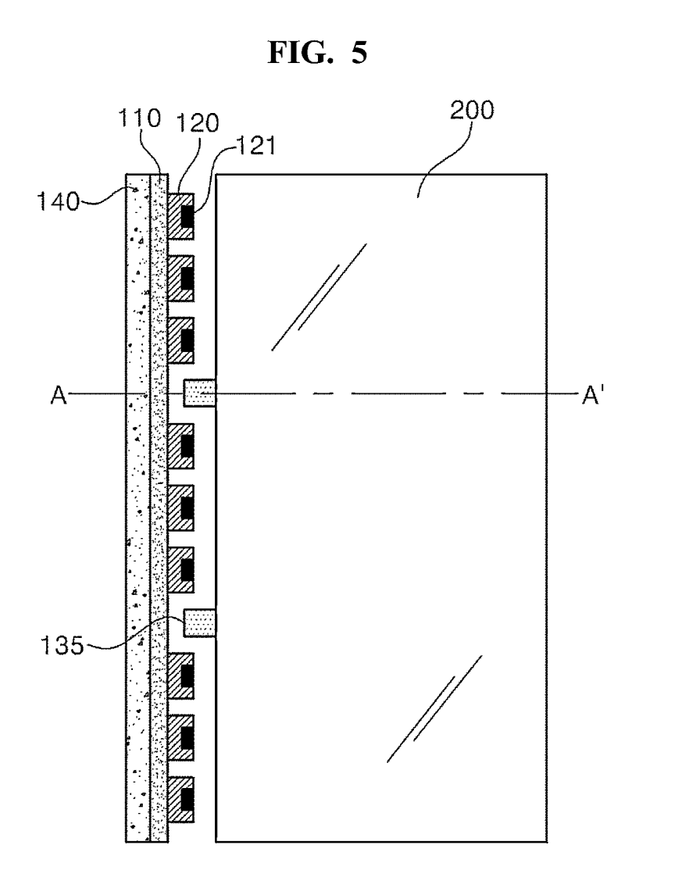
Figure 6:
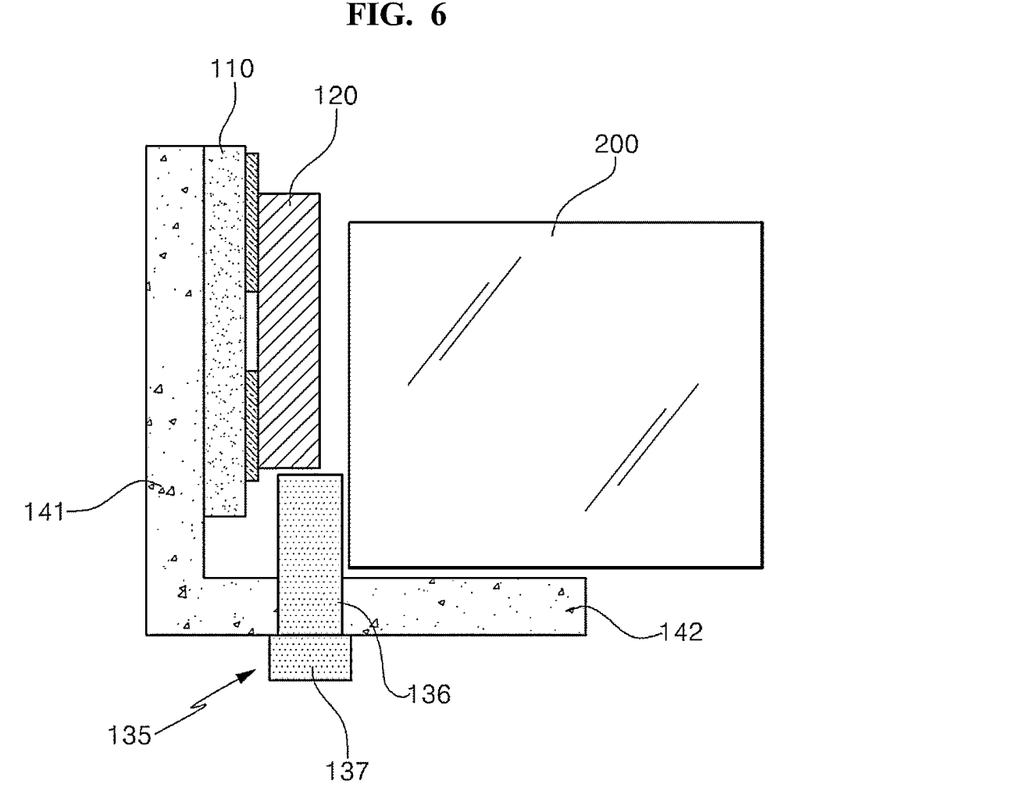

FIGS. 4 to 6 are views for explaining a lighting unit according to another embodiment of the present invention.

More specifically, FIG. 4 is a perspective view of a lighting unit according to the other embodiment of the present invention, FIG. 5 is a top view of a lighting unit according to the other embodiment of the present invention, and FIG. 6 is a cross-sectional view of a lighting unit according to the other embodiment of the present invention and illustrate a cross section taken along lines A-A' of FIG. 5.

The lighting unit according to the present embodiment of the invention will be hereinafter described with reference to FIGS. 4 to 6.

As illustrated in FIG. 4, the lighting unit according to the present embodiment of the invention includes: the circuit board 110; a light emitting package 120; and a stopper 135.

The light emitting package 120 is mounted on the printed circuit board 110, the light source 121 is provided in the light emitting package 120, and the printed circuit board 110 is configured such that a wiring pattern is printed on a substrate made of a polyimide material. Meanwhile, a light emitting diode (LED) may be used as the light source 121.

The stopper 135 is configured to support the light guide plate, and enables the light source 121, the light emitting package 120 or the printed circuit board 110 to be prevented from being damaged because the light guide plate 200 comes into contact with the light source 121 or the light emitting package 120 when the light guide plate 200 thermally expands. At this time, as illustrated in FIG. 4, the stopper 135 is provide on one surface of the support substrate 140.

The configuration of the lighting unit according to the present embodiment of the invention will be hereinafter described in greater detail with reference to FIGS. 5 to 6.

The printed circuit board 110 is stably mounted on the support substrate 140, and the light emitting package having the light source 121 is mounted on the printed circuit board 110.

The stopper passes through the printed circuit board 110 and is fixed on the support substrate 140.

More specifically, as illustrated in FIG. 6, the stopper 135 is composed of a body portion 136 and a fixed portion 137. The body portion 136 is an element that passes through the support substrate 140, and the fixed portion 137 is an element that is formed at end of the body portion 136 and is fixed to the support substrate 142. At this time, when a pin or a screw is used as the fixed portion 132, a fixed portion may be further surely fixed so that the light guide plate 200 can be stably supported.

Meanwhile, in the embodiment of FIGS. 4 to 6, the stopper 134 may be disposed on the support substrate 140. That is, the support substrate 140 may be composed of the first substrate portion 141 corresponding to a portion on which the printed circuit board 110 is stably mounted and the second substrate portion 142 disposed perpendicular to the first substrate portion 142, and the stopper 135 may be fixed on the second substrate portion 142 so as to support the light guide plate 200.

At this time, each of the support substrates 141, 142 may contain at least one of Al, Au, Ag, and Cr, and the stopper 130 may contain at least one metal material of Al, Au, Ag, and Cr, at least one non-metallic inorganic material of glass, ceramic, cement, and refractory, or at least one resin material of polyethylene terephthalate (PET), polycarbonate (PC), polyether sulfone (PES), polyimide (PI) and polymethyl methacrylate (PMMA).

Figure 7:
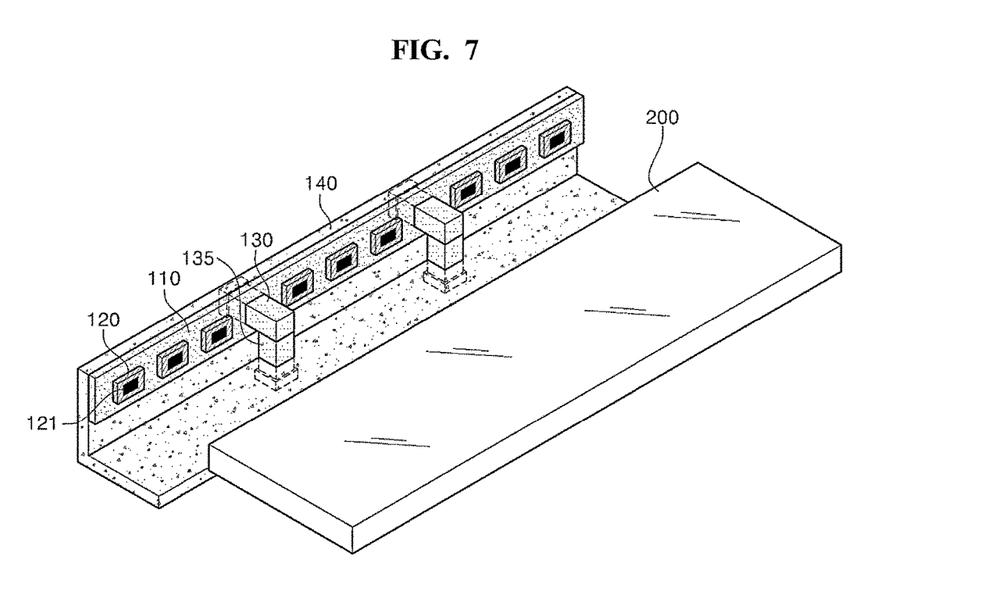
FIGS. 7 to 9 are views for explaining a lighting unit according to a further another embodiment of the present invention.
Figure 8:
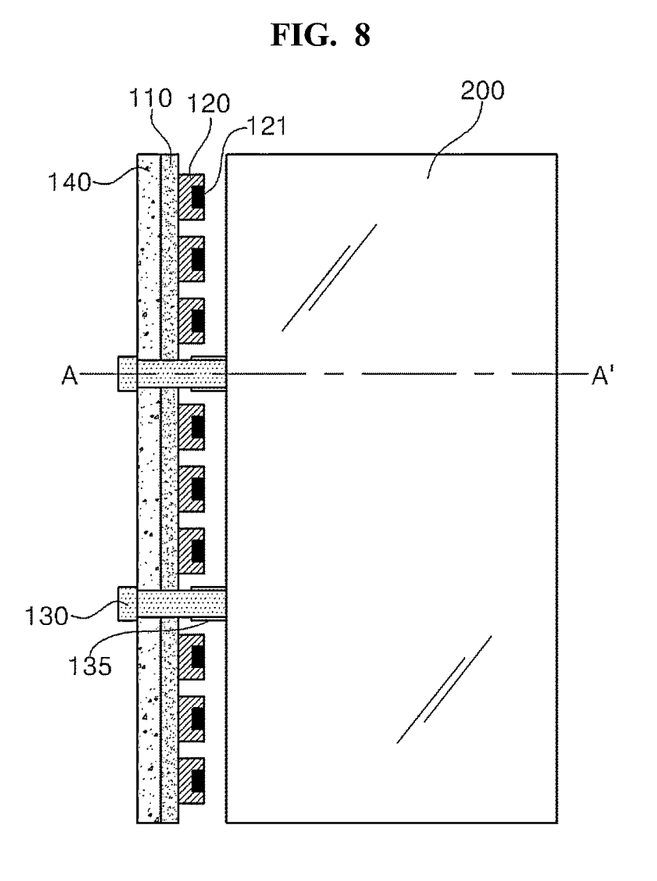
Figure 9:
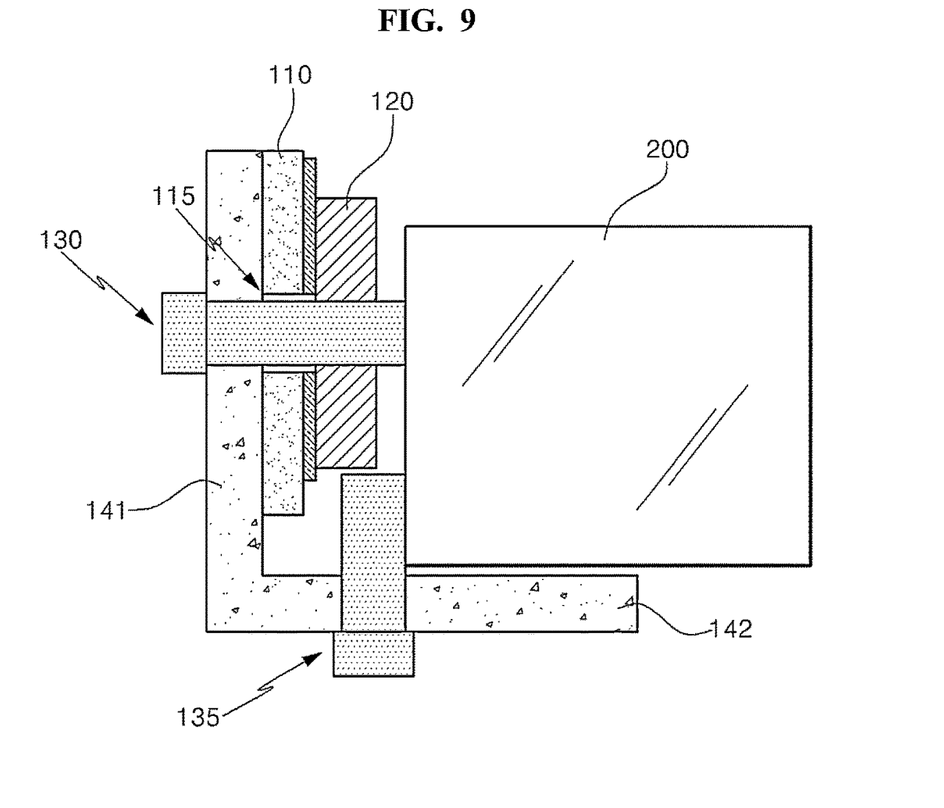

FIGS. 7 to 9 are views for explaining a lighting unit according to a further another embodiment of the present invention.

More specifically, FIG. 7 is a perspective view of a lighting unit according to the further another embodiment of the present invention, FIG. 8 is a top view of a lighting unit according to the further another embodiment of the present invention, and FIG. 9 is a cross-sectional view of a lighting unit according to the further another embodiment of the present invention and illustrates a cross section taken along lines A-A' of FIG. 8.

The lighting unit according to the present embodiment of the invention will be hereinafter described in greater detail with reference to FIGS. 7 to 9.

As illustrated in FIG. 7, the light unit according to the present embodiment of the invention includes: printed circuit board 110; the light emitting package 120; the first stopper 130; and the second stopper 135.

The light emitting package 120 is mounted on the printed circuit board 110, the light source 121 is provided in the light emitting package 120, the printed circuit board 110 is configured such that a wiring pattern is printed on a substrate made of a polyimide (PI) material, and the light emitting diode (LED) may be used as the light source 121.

The first stopper 130 and the second stopper 135 support the light guide plate 200, and enable the light source 121, the light emitting package 120 or the printed circuit board 110 to be prevented from being damaged because the light guide plate 200 comes into contact with the light source 121 or the light emitting package 120 when the light guide 200 thermally expands.

As illustrated in FIG. 7, the first stopper 130 is fixedly disposed in a separation space between the light emitting package 120 and an adjacent light emitting package, and the second stopper 135 is fixedly disposed on the support substrate 140.

As such, when the first stopper 130 and the second stopper 135 are disposed to protrude toward different directions from each other, the light guide plate 200 may be stably firmly supported.

The configuration of the lighting unit according to the present embodiment of the invention will be hereinafter described in detail with reference to FIGS. 8 and 9.

The printed circuit board 110 is stably fixed on the support substrate 130, and the light emitting package 120 having the light source is stably mounted on the printed circuit board 110.

The first stopper 130 is fixed to the support substrate 141 supporting the printed circuit board 110 by passing through the printed circuit board 110.

Meanwhile, the second stopper 135 is directly fixed on the support substrate 142, and at this time, the second stopper 135 is fixed on the support substrate 142 in a direction which crosses at right angles to the first stopper 130.

More specifically, the support substrate 140 is composed of a first substrate portion 141 corresponding to a portion on which the printed circuit board 110 is stably mounted, and a second substrate portion 142 disposed to be bent perpendicular to the first substrate portion 141, the first stopper 130 is fixed on the first substrate portion 141, and the second stopper 135 is fixed on the second substrate portion 142.

That is, the through hole 115 is provide in the first substrate portion 141, and thus the first stopper 130 is configured to be inserted into the through hole 115 not to come into direct contact with the printed circuit board 110, and the second stopper 135 is directly fixed on the support substrate in a direction which crosses at right angles to the first stopper 130.

As such, when the first stopper 130 and the second stopper 135 are fixed in the direction in which the first stopper and the second stopper cross at right angles to each other, the light guide plate can be stably supported, thereby enabling a defect to be reduced by dispersing stress generated due to thermal expansion of the light guide plate.

As set forth above, according to some embodiments of the present invention, since the stopper is configured in a structure which enables the light guide plate to be surely supported, the light emitting package or the printed circuit board can be effectively protected.

Also, according to some embodiments of the present invention, since the stopper may be firmly supported even when the light guide plate thermally expands, structural reliability of the light unit can be improved.

Also, according to some embodiments of the present invention, the stopper is configured to support a light guide plate in various directions so that stress generated due to thermal expansion of the light guide plate can be dispersed, thereby enabling a crack to be prevented from occurring in a light package or a printed circuit board.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A lighting unit, comprising:
a support substrate;
a printed circuit board disposed on the support substrate;
a light guide plate for guiding light generated from a light source;
a first stopper fixed to the support substrate, protruding therefrom in a first direction, and configured to support the light guide plate; and
a second stopper fixed to the support substrate, protruding therefrom in a second direction different from the first direction, and configured to support the light guide plate;
wherein the first stopper is spaced apart from the printed circuit board,
wherein the first stopper and the second stopper are in direct contact with a same side of the light guide plate,
wherein each of the first stopper and the second stopper has an overlap region in the second direction, and
wherein an area of the overlap region of the first stopper is smaller than an area of a side surface of the second stopper in the second direction.

2. The lighting unit of claim 1, wherein the light source is mounted on the printed circuit board and the first stopper passes through the printed circuit board.

3. The lighting unit of claim 2, wherein the printed circuit board comprises a through hole, wherein the first stopper is inserted into the through hole and is configured not to come into contact with the printed circuit board.

4. The lighting unit of claim 2, wherein the support substrate comprises: a first substrate portion on which the printed circuit board is stably fixed; and a second substrate portion extending to be bent from the first substrate portion.

5. The lighting unit of claim 4, wherein the first stopper is fixed to the first substrate portion.

6. The lighting unit of claim 5, wherein the light source is composed of light emitting diodes (LEDs).

7. The lighting unit of claim 4, wherein the second stopper is fixed to the second substrate portion.

8. The lighting unit of claim 7, wherein the first stopper or the second stopper passes through the support substrate.

9. The lighting unit of claim 7, wherein the first stopper or the second stopper comprises: a body portion passing through the printed circuit board; and a fixed portion formed at an end of the body portion and fixed to the support substrate.

10. The lighting unit of claim 9, wherein the fixed portion is composed of a pin or a screw.

11. The lighting unit of claim 7, wherein the first stopper and the second stopper are disposed to cross at right angles to each other.

12. The lighting unit of claim 7, wherein the first stopper or the second stopper contains at least one of gold, silver, copper, tin, lead, iron, Al, Cr, and mercury, at least one of glass, ceramic, cement, and refractory; or at least one of polyethylene terephthalate (PET), polycarbonate (PC), polyether sulfone (PES), polyimide (PI), and polymethyl methacrylate (PMMA).

13. The lighting unit of claim 1, wherein the first direction is perpendicular to the second direction.

14. The lighting unit of claim 1, wherein the first stopper is fixed in a space between the light source and an adjacent light source.

15. The lighting unit of claim 1, wherein the first stopper supports one surface of the light guide plate into which light from the light source flows.

16. The lighting unit of claim 1, further comprising a light emitting package having the light source.

* * * * *